United States Patent [19]
Johansson

[11] 3,946,576
[45] Mar. 30, 1976

[54] FLEXIBLE COUPLING
[75] Inventor: Carl Eric Johansson, Blaricum, Netherlands
[73] Assignee: SKF Industrial Trading and Development Company B.V., Jutphaas, Netherlands
[22] Filed: Apr. 4, 1973
[21] Appl. No.: 347,738

[30] Foreign Application Priority Data
Apr. 7, 1972 Netherlands.................. 7204642

[52] U.S. Cl.................. 64/11 R; 64/14; 64/27 NM
[51] Int. Cl............................................ F16d 3/17
[58] Field of Search ....... 64/11 R, 14, 27 NM, 27 R

[56] References Cited
UNITED STATES PATENTS

| | | | |
|---|---|---|---|
| 1,368,574 | 2/1921 | Romney | 64/11 |
| 1,791,763 | 2/1931 | Peters | 64/14 |
| 2,038,020 | 4/1936 | Wylie | 64/27 |
| 2,238,531 | 4/1941 | Malmquist | 64/11 |
| 2,356,572 | 8/1944 | Dorning | 64/14 |
| 2,564,826 | 8/1951 | Yoder | 64/11 |

FOREIGN PATENTS OR APPLICATIONS
1,425,389   1/1963   Germany .................. 64/11

Primary Examiner—Benjamin W. Wyche
Assistant Examiner—Randall Heald
Attorney, Agent, or Firm—Daniel M. Rosen

[57] ABSTRACT

Flexible coupling comprising two coupling halves of which part of the coupling half projects into another coupling half, both coupling halves being connected to transmit power by means of elastic elements all of which are always evenly loaded, characterized in that the elastic elements are enclosed by the coupling halves over their entire surface, whilst at least one coupling half consists of more dividable parts.

6 Claims, 5 Drawing Figures

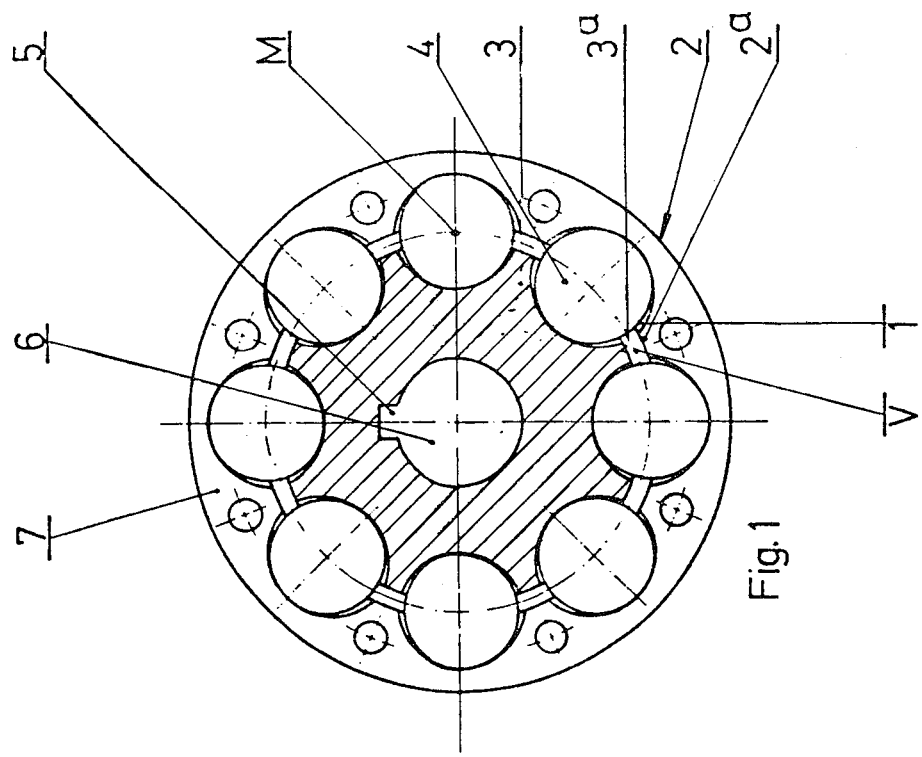
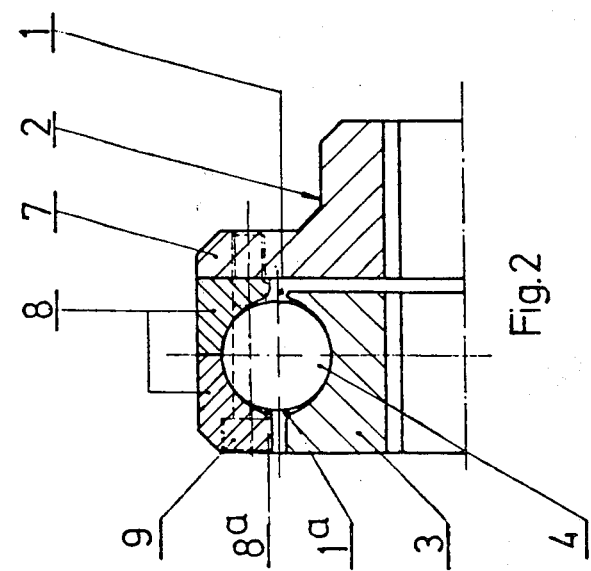

FLEXIBLE COUPLING

The invention relates to a flexible coupling, comprising two coupling halves, wherein part of the coupling half projects into another coupling half, both coupling halves being connected to transmit power by means of elastic elements, all elements being continuously under a uniform load.

There is a known flexible coupling of such type described in the French Pat. No. 1286924. In this type the elastic elements are enclosed only partly by the coupling halves, and are fitted with an axial clearance into the channels of the corresponding coupling half.

The invention provides a flexible coupling, presenting the advantage that an optimum uniform power transmission is ensured from one coupling half to the other one under any operative conditions, since all elastic elements are exposed to a uniform load in the axial and radial direction as well. Also a simplified mounting and dismounting of such coupling is realized. For these purposes the elastic elements are enclosed by the coupling halves essentially over their entire surface, while at least one of the coupling halves consists of more dividable or separable parts.

The invention will be described in detail with reference to drawings, showing advantages and other characteristics thereof.

In the drawings:

FIG. 1 is a cross-section of a coupling according to the invention;

FIG. 2 is a longitudinal section of a part of the coupling according to FIG. 1;

Figure 3:
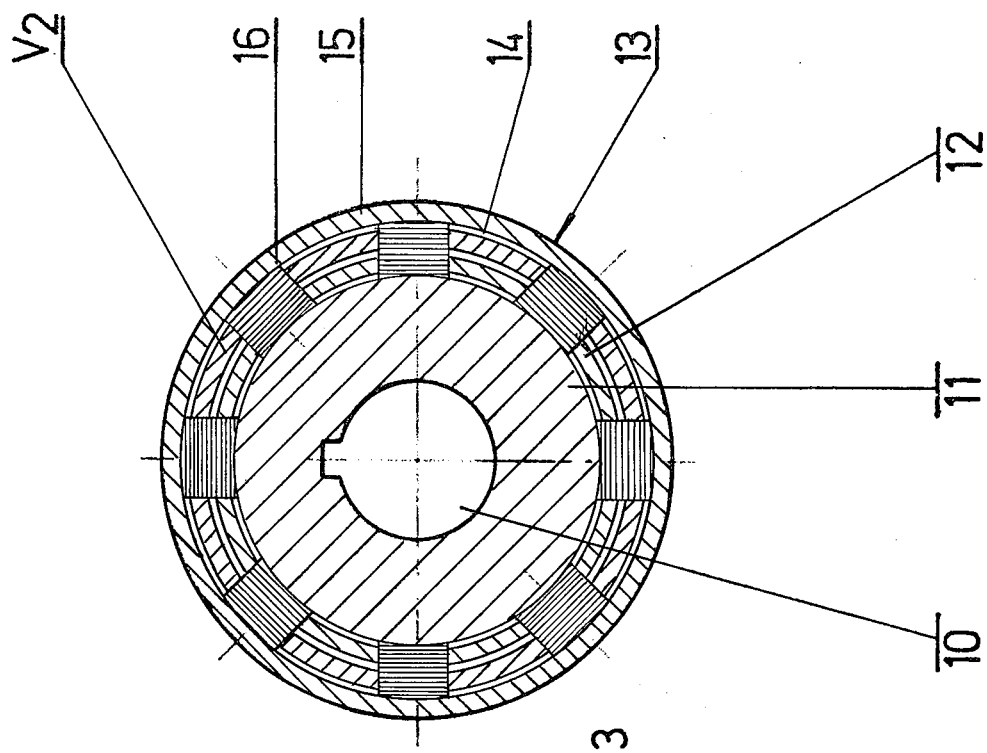
FIG. 3 is a cross-section of another embodiment of a coupling according to the invention.

According to the representation of FIG. 1 elastic elements 4 are arranged in chambers or spaces 1 of the two coupling halves 2 and 3 on the periphery of the coupling 2, 3, at uniform distances. Preferably such elastic elements are made of rubber displaying a Shore hardness of 60 to 80. The coupling half 3 is connected on the shaft 6 by means of a key 5 while the other coupling half 2 is connected on a second shaft, not shown in the drawing. In this preferred embodiment of the invention the elements 4 are ball-shaped while the chambers 1 being so executed that the ball-shaped elements 4 are completely enclosed. An advantage of this arrangement is that the centers M of the ball-shaped elements 4 are arranged approximately on the boundary surface V between the end surfaces 2A and 3A of the coupling halves 2 and 3, respectively such arrangement ensures a uniform load distribution in an advantageous manner. Furthermore, since the diameter of a ball-shaped element 4 is larger than the maximum distance between the walls of the chamber or space 1 of the co-acting coupling halves, comprising the element, the chamber or space 1 will be nearly completely filled up and consequently the element 4 will be kept advantageously under a certain tension. Such arrangement ensures the favourable effect which has been aimed at.

According to the representation in FIG. 2 the coupling half 2 is composed of two parts 7 and 8, which are interconnected by a bolt 9. Such construction simplifies the mounting and dismounting of the parts 3, 7 and 8. Moreover, no difficulties are encountered with regard to the centering of both coupling halves in any application of the coupling according to the invention, also due to the fact that in the preferred embodiment of the invention the coupling member 8 is executed in a divided or separable form and consequently the degree of tightening of the bolt 9 affects accordingly to the tension in the element 4. Thus, the coupling half 2 comprises a ring-shaped member 8, provided with a cup-shaped cavity 8A, forming with the cavity 1A of the coupling half 3 the chamber or space 1 enclosing the elastic element 4. The ring 8 is fastened through the said bolt connection 9 to a flange 7 which also forms a part of the coupling half 2.

It has to be pointed out that in order to obtain the required effect the chamber or space 1 of both coupling halves need not to be shaped or dimensioned according to strict prescriptions; any form is suitable for obtaining the required effect provided that the chamber or space is entirely filled up by a pre-stressed elastic element.

FIG. 3 represents the cross-section of another embodiment of a coupling according to the invention. The coupling half 11 is fixed by keying on a shaft 10, the said coupling half 11 comprising a ring 12, provided with apertures 12A (see also FIG. 4) uniformly spaced apart from one another. The other coupling half 13 comprises a ring 14 as well, provided with apertures 14A which, in assembled state, face the apertures 12A of the coupling half 11. According to this embodiment of the invention an oblong elastic element 16 is arranged in the space 12A and 14A of the rings 12 and 14, resp., and now completely enclosed by the coupling half 11,a 15 and the rings 12 and 14. This arrangement presents the additional advantage, that the axis of an element 16 is positioned in the parting face $V_2$ of the rings 12 and 14 thereby ensuring an optimum and uniform power transmission.

Figure 4:
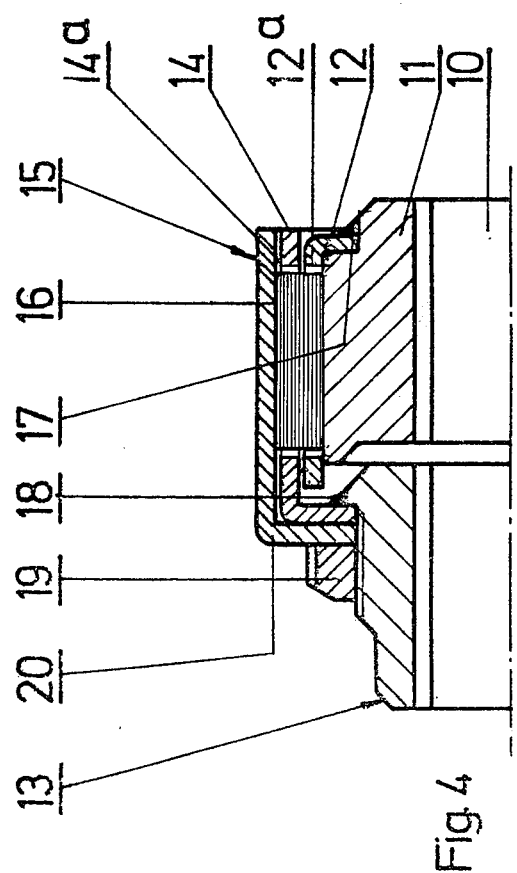
FIG. 4 is a longitudinal section of a part of the coupling according to FIG. 3.

According to the representation in FIG. 4 the rings 12 and 14 are fastened through welding connections 17 and 18, resp. to the coupling halves 11 and 13, resp. Over the ring 14 a bush-like element 15 is fitted, which is applied on the coupling half 13 and is fastened to the ring 14 by means of a tightening nut 19. An advantage of such arrangement is that the part 20 of the element 15 owing to a conical or tapered shape causes, in simple manner, pre-stressing in the element 16. By this the degree of conicity or tapered shape of said bush-like elements 15 determines the extent of pre-stressing.

Figure 5:
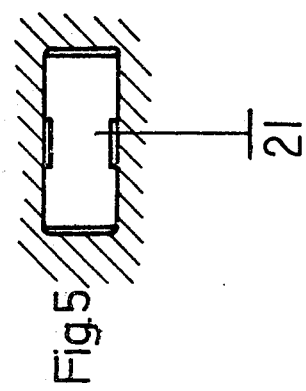
FIG. 5 is a suitable execution of an elastic element.

FIG. 5 represents the execution form of an oblong symmetrical coupling element 21, the application of which permits favourable functioning in case of a diameter/length ratio of about 1:2. If for example the material composition of one of the elements 21 differs somewhat from the material composition of the other coupling elements affecting thereby more or less the uniform power transmission, it will still be possible to achieve the desired aim in a relatively simple manner, by grinding off a small part of the corresponding element, the degree of grinding-off being determined by comparative measurements.

It is evident that the invention is not restricted to the described embodiments. Actually, elastic elements of any shape can be applied, provided that they fill-up completely the chambers or spaces wherein they are applied and are kept all-sided under a certain pre-tension.

I claim:

1. A flexible coupling comprising first and second coupling halves, a portion of said first coupling half projecting into said second coupling half, said coupling halves having facing portions defining a plurality of spaces therebetween, elastic means substantially completely encased in the spaces defined by said facing portions of said first and second halves along said projection, said coupling halves facing portions including a ring shaped member mounted in the circumference of said coupling halves and applying a compressive force to said elastic means so that said elastic means fill said spaces, therein enabling said elastic means to be equally loadable in both rotating directions of said coupling.

2. The coupling of claim 1 wherein said ring shaped member is radially separate from one of said coupling halves.

3. The coupling of claim 2 wherein said one of said facing portions is internally cup shaped and said elastic means are spherical and are partially encased by said cup shaped facing portions, said radially separate elements being connected to each other by axially directed fastening means.

4. The coupling of claim 1 wherein said elastic means are a plurality of rubber balls encased between said coupling half facing portions in cup shaped holes formed in said facing portions.

5. The coupling of claim 1 wherein one of said coupling halves includes a conically shaped bush.

6. The coupling of claim 5 wherein said elastic means includes a plurality of elastic elements supported between said conically shaped bush and the other of said coupling halves.

* * * * *

UNITED STATES PATENT AND TRADEMARK OFFICE
CERTIFICATE OF CORRECTION

PATENT NO. : 3,946,576
DATED : March 30, 1976
INVENTOR(S) : Carl Eric Johansson

It is certified that error appears in the above-identified patent and that said Letters Patent are hereby corrected as shown below:

Column 2, line 34, before "15" insert --bush like element--

Signed and Sealed this

Fourteenth Day of December 1976

[SEAL]

Attest:

RUTH C. MASON
*Attesting Officer*

C. MARSHALL DANN
*Commissioner of Patents and Trademarks*